United States Patent
Olson et al.

(10) Patent No.: US 9,104,273 B1
(45) Date of Patent: Aug. 11, 2015

(54) MULTI-TOUCH SENSING METHOD

(75) Inventors: Dana Olson, Kirkland, WA (US);
Nathan Moyal, Mukilteo, WA (US)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 1069 days.

(21) Appl. No.: 12/395,969

(22) Filed: Mar. 2, 2009

Related U.S. Application Data

(60) Provisional application No. 61/067,743, filed on Feb. 29, 2008.

(51) Int. Cl.
*G06F 3/044* (2006.01)

(52) U.S. Cl.
CPC .................................... *G06F 3/044* (2013.01)

(58) Field of Classification Search
CPC ........................................................ G06F 3/044
USPC ........................................ 345/173; 178/18.06
See application file for complete search history.

(56) References Cited

U.S. PATENT DOCUMENTS

| | | | |
|---|---|---|---|
| 3,660,801 A | 5/1972 | Paulfus | |
| 3,921,167 A | 11/1975 | Fox | |
| 3,979,745 A | 9/1976 | Bishop | |
| 4,039,940 A | 8/1977 | Butler et al. | |
| 4,090,092 A | 5/1978 | Serrano | |
| 4,103,252 A | 7/1978 | Bobick | |
| 4,113,378 A | 9/1978 | Wirtz | |
| 4,145,748 A | 3/1979 | Eichelberger et al. | |
| 4,193,063 A | 3/1980 | Hitt et al. | |
| 4,238,711 A | 12/1980 | Wallot | |
| 4,266,144 A | 5/1981 | Bristol | |
| 4,283,713 A | 8/1981 | Philipp | |
| 4,292,604 A | 9/1981 | Embree et al. | |
| 4,293,734 A | 10/1981 | Pepper, Jr. | |
| 4,438,404 A | 3/1984 | Philipp | |
| 4,475,151 A | 10/1984 | Philipp | |
| 4,497,575 A | 2/1985 | Philipp | |
| 4,558,274 A | 12/1985 | Carusillo | |
| 4,586,260 A | 5/1986 | Baxter et al. | |
| 4,728,932 A | 3/1988 | Atherton | |
| 4,736,097 A | 4/1988 | Philipp | |
| 4,736,191 A | 4/1988 | Matzke et al. | |
| 4,742,331 A | 5/1988 | Barrow et al. | |
| 4,772,983 A | 9/1988 | Kerber et al. | |
| 4,773,024 A | 9/1988 | Faggin et al. | |
| 4,802,103 A | 1/1989 | Faggin et al. | |

(Continued)

FOREIGN PATENT DOCUMENTS

| | | |
|---|---|---|
| EP | 0574213 A | 12/1993 |
| GB | 05000604 | 2/2005 |

(Continued)

OTHER PUBLICATIONS

CSR User Module, CSR v1.0, CY8C21x34 Data Sheet, Cypress Semiconductor Corporation, Oct. 6, 2005, pp. 1-36.

(Continued)

*Primary Examiner* — Quan-Zhen Wang
*Assistant Examiner* — David Lee
(74) *Attorney, Agent, or Firm* — Lowenstein Sandler LLP

(57) ABSTRACT

A capacitance measurement sensor, having a voltage subtractor that rejects common signals between the columns or rows of a touch sensor matrix depending on which are driven and which are being sensed, is described.

19 Claims, 5 Drawing Sheets

(56) References Cited

U.S. PATENT DOCUMENTS

| | | | |
|---|---|---|---|
| 4,825,147 A | 4/1989 | Cook et al. | |
| 4,876,534 A | 10/1989 | Mead et al. | |
| 4,878,013 A | 10/1989 | Andermo | |
| 4,879,461 A | 11/1989 | Philipp | |
| 4,879,505 A | 11/1989 | Barrow et al. | |
| 4,920,399 A | 4/1990 | Hall | |
| 4,935,702 A | 6/1990 | Mead et al. | |
| 4,940,980 A | 7/1990 | Tice | |
| 4,953,928 A | 9/1990 | Anderson et al. | |
| 4,962,342 A | 10/1990 | Mead et al. | |
| 4,977,480 A | 12/1990 | Nishihara | |
| 5,008,497 A | 4/1991 | Asher | |
| 5,049,758 A | 9/1991 | Mead et al. | |
| 5,055,827 A | 10/1991 | Philipp | |
| 5,059,920 A | 10/1991 | Anderson et al. | |
| 5,068,622 A | 11/1991 | Mead et al. | |
| 5,073,759 A | 12/1991 | Mead et al. | |
| 5,083,044 A | 1/1992 | Mead et al. | |
| 5,089,757 A * | 2/1992 | Wilson | 318/560 |
| 5,095,284 A | 3/1992 | Mead | |
| 5,097,305 A | 3/1992 | Mead et al. | |
| 5,107,149 A | 4/1992 | Platt et al. | |
| 5,109,261 A | 4/1992 | Mead et al. | |
| 5,119,038 A | 6/1992 | Anderson et al. | |
| 5,120,996 A | 6/1992 | Mead et al. | |
| 5,122,800 A | 6/1992 | Philipp | |
| 5,126,685 A | 6/1992 | Platt et al. | |
| 5,146,106 A | 9/1992 | Anderson et al. | |
| 5,160,899 A | 11/1992 | Anderson et al. | |
| 5,165,054 A | 11/1992 | Platt et al. | |
| 5,166,562 A | 11/1992 | Allen et al. | |
| 5,204,549 A | 4/1993 | Platt et al. | |
| 5,214,388 A | 5/1993 | Vranish et al. | |
| 5,237,879 A | 8/1993 | Speeter | |
| 5,243,554 A | 9/1993 | Allen et al. | |
| 5,248,873 A | 9/1993 | Allen et al. | |
| 5,260,592 A | 11/1993 | Mead et al. | |
| 5,270,963 A | 12/1993 | Allen et al. | |
| 5,276,407 A | 1/1994 | Mead et al. | |
| 5,281,862 A | 1/1994 | Ma | |
| 5,289,023 A | 2/1994 | Mead | |
| 5,294,889 A | 3/1994 | Heep et al. | |
| 5,303,329 A | 4/1994 | Mead et al. | |
| 5,305,017 A | 4/1994 | Gerpheide | |
| 5,323,158 A | 6/1994 | Ferguson, Jr. | |
| 5,324,958 A | 6/1994 | Mead et al. | |
| 5,331,215 A | 7/1994 | Allen et al. | |
| 5,336,936 A | 8/1994 | Allen et al. | |
| 5,339,213 A | 8/1994 | O'Callaghan | |
| 5,349,303 A | 9/1994 | Gerpheide | |
| 5,373,245 A | 12/1994 | Vranish | |
| 5,374,787 A | 12/1994 | Miller et al. | |
| 5,381,515 A | 1/1995 | Platt et al. | |
| 5,384,467 A | 1/1995 | Plimon et al. | |
| 5,386,219 A | 1/1995 | Greanias et al. | |
| 5,408,194 A | 4/1995 | Steinbach et al. | |
| 5,412,387 A | 5/1995 | Vincelette et al. | |
| 5,461,321 A | 10/1995 | Sanders et al. | |
| 5,479,103 A | 12/1995 | Kernahan et al. | |
| 5,488,204 A | 1/1996 | Mead et al. | |
| 5,495,077 A | 2/1996 | Miller et al. | |
| 5,518,078 A | 5/1996 | Tsujioka et al. | |
| 5,525,980 A | 6/1996 | Jahier et al. | |
| 5,541,580 A | 7/1996 | Gerston et al. | |
| 5,541,878 A | 7/1996 | Lemoncheck et al. | |
| 5,543,590 A | 8/1996 | Gillespie et al. | |
| 5,543,591 A | 8/1996 | Gillespie et al. | |
| 5,555,907 A | 9/1996 | Philipp | |
| 5,566,702 A | 10/1996 | Philipp | |
| 5,572,205 A | 11/1996 | Caldwell et al. | |
| 5,629,891 A | 5/1997 | Lemoncheck et al. | |
| 5,650,597 A * | 7/1997 | Redmayne | 178/18.06 |
| 5,670,915 A | 9/1997 | Cooper et al. | |
| 5,672,959 A | 9/1997 | Der | |
| 5,680,070 A | 10/1997 | Anderson et al. | |
| 5,682,032 A | 10/1997 | Philipp | |
| 5,684,487 A | 11/1997 | Timko | |
| 5,694,063 A | 12/1997 | Burlison et al. | |
| 5,730,165 A | 3/1998 | Philipp | |
| 5,757,368 A | 5/1998 | Gerpheide et al. | |
| 5,760,852 A | 6/1998 | Wu et al. | |
| 5,763,909 A | 6/1998 | Mead et al. | |
| 5,763,924 A | 6/1998 | Lum et al. | |
| 5,767,457 A | 6/1998 | Gerpheide et al. | |
| 5,796,183 A | 8/1998 | Hourmand et al. | |
| 5,801,340 A | 9/1998 | Peter | |
| 5,812,698 A | 9/1998 | Platt et al. | |
| 5,841,078 A | 11/1998 | Miller et al. | |
| 5,844,265 A | 12/1998 | Mead et al. | |
| 5,854,625 A | 12/1998 | Frisch et al. | |
| 5,861,583 A | 1/1999 | Schediwy et al. | |
| 5,861,875 A | 1/1999 | Gerpheide | |
| 5,864,242 A | 1/1999 | Allen et al. | |
| 5,864,392 A | 1/1999 | Winklhofer et al. | |
| 5,880,411 A | 3/1999 | Gillespie et al. | |
| 5,889,236 A | 3/1999 | Gillespie et al. | |
| 5,914,465 A | 6/1999 | Allen et al. | |
| 5,914,708 A | 6/1999 | Lagrange et al. | |
| 5,920,310 A | 7/1999 | Faggin et al. | |
| 5,926,566 A | 7/1999 | Wang et al. | |
| 5,942,733 A | 8/1999 | Allen et al. | |
| 5,943,052 A | 8/1999 | Allen et al. | |
| 6,023,422 A | 2/2000 | Allen et al. | |
| 6,028,271 A | 2/2000 | Gillespie et al. | |
| 6,028,959 A | 2/2000 | Wang et al. | |
| 6,037,929 A | 3/2000 | Ogura et al. | |
| 6,060,957 A | 5/2000 | Kodrnja et al. | |
| 6,097,432 A | 8/2000 | Mead et al. | |
| 6,145,850 A | 11/2000 | Rehm | |
| 6,148,104 A | 11/2000 | Wang et al. | |
| 6,184,871 B1 | 2/2001 | Teres et al. | |
| 6,188,228 B1 | 2/2001 | Philipp | |
| 6,188,391 B1 | 2/2001 | Seely et al. | |
| 6,191,723 B1 | 2/2001 | Lewis | |
| 6,222,528 B1 | 4/2001 | Gerpheide et al. | |
| 6,239,389 B1 | 5/2001 | Allen et al. | |
| 6,249,447 B1 | 6/2001 | Boylan et al. | |
| 6,262,717 B1 | 7/2001 | Donohue et al. | |
| 6,271,719 B1 | 8/2001 | Sevastopoulos | |
| 6,271,720 B1 | 8/2001 | Sevastopoulos | |
| 6,278,283 B1 | 8/2001 | Tsugai | |
| 6,288,707 B1 | 9/2001 | Philipp | |
| 6,304,014 B1 | 10/2001 | England et al. | |
| 6,320,184 B1 | 11/2001 | Winklhofer et al. | |
| 6,323,846 B1 | 11/2001 | Westerman et al. | |
| 6,342,817 B1 | 1/2002 | Crofts et al. | |
| 6,344,773 B1 | 2/2002 | Sevastopoulos et al. | |
| 6,366,099 B1 | 4/2002 | Reddi | |
| 6,377,009 B1 | 4/2002 | Philipp | |
| 6,377,129 B1 | 4/2002 | Rhee et al. | |
| 6,380,929 B1 | 4/2002 | Platt | |
| 6,400,217 B1 | 6/2002 | Bhandari | |
| 6,414,671 B1 | 7/2002 | Gillespie et al. | |
| 6,430,305 B1 | 8/2002 | Decker | |
| 6,441,073 B1 | 8/2002 | Tanaka et al. | |
| 6,441,682 B1 | 8/2002 | Vinn et al. | |
| 6,445,257 B1 | 9/2002 | Cox et al. | |
| 6,457,355 B1 | 10/2002 | Philipp | |
| 6,459,321 B1 | 10/2002 | Belch | |
| 6,473,069 B1 | 10/2002 | Gerpheide | |
| 6,476,798 B1 * | 11/2002 | Bertram et al. | 345/174 |
| 6,489,899 B1 | 12/2002 | Ely et al. | |
| 6,490,203 B1 | 12/2002 | Tang | |
| 6,498,720 B2 | 12/2002 | Glad | |
| 6,499,359 B1 | 12/2002 | Washeleski et al. | |
| 6,522,083 B1 | 2/2003 | Roach | |
| 6,522,128 B1 | 2/2003 | Ely et al. | |
| 6,522,187 B1 | 2/2003 | Sousa | |
| 6,523,416 B2 | 2/2003 | Takagi et al. | |
| 6,529,015 B2 | 3/2003 | Nonoyama et al. | |
| 6,534,970 B1 | 3/2003 | Ely et al. | |
| 6,535,200 B2 | 3/2003 | Philipp | |
| 6,570,557 B1 | 5/2003 | Westerman et al. | |
| 6,574,095 B2 | 6/2003 | Suzuki | |

(56) References Cited

U.S. PATENT DOCUMENTS

| | | |
|---|---|---|
| 6,577,140 B1 | 6/2003 | Wenman |
| 6,587,093 B1 | 7/2003 | Shaw et al. |
| 6,610,936 B2 | 8/2003 | Gillespie et al. |
| 6,614,313 B2 | 9/2003 | Crofts et al. |
| 6,624,640 B2 | 9/2003 | Lund et al. |
| 6,642,857 B1 | 11/2003 | Schediwy et al. |
| 6,649,924 B1 | 11/2003 | Philipp et al. |
| 6,667,740 B2 | 12/2003 | Ely et al. |
| 6,673,308 B2 | 1/2004 | Hino et al. |
| 6,677,758 B2 | 1/2004 | Maki et al. |
| 6,677,932 B1 | 1/2004 | Westerman |
| 6,680,731 B2 | 1/2004 | Gerpheide et al. |
| 6,683,462 B2 | 1/2004 | Shimizu |
| 6,690,066 B1 | 2/2004 | Lin et al. |
| 6,705,511 B1 | 3/2004 | Dames et al. |
| 6,730,863 B1 | 5/2004 | Gerpheide et al. |
| 6,731,121 B1 | 5/2004 | Hsu et al. |
| 6,744,258 B2 | 6/2004 | Ishio et al. |
| 6,750,852 B2 | 6/2004 | Gillespie et al. |
| 6,768,420 B2 | 7/2004 | McCarthy et al. |
| 6,774,644 B2 | 8/2004 | Eberlein |
| 6,788,221 B1 | 9/2004 | Ely et al. |
| 6,788,521 B2 | 9/2004 | Nishi |
| 6,806,693 B1 | 10/2004 | Bron |
| 6,809,275 B1 | 10/2004 | Cheng et al. |
| 6,810,442 B1 | 10/2004 | Lin et al. |
| 6,825,673 B1 | 11/2004 | Yamaoka |
| 6,829,727 B1 | 12/2004 | Pawloski |
| 6,838,887 B2 | 1/2005 | Denen et al. |
| 6,856,433 B2 | 2/2005 | Hatano et al. |
| 6,859,159 B2 | 2/2005 | Michalski |
| 6,873,203 B1 | 3/2005 | Latham et al. |
| 6,879,215 B1 | 4/2005 | Roach |
| 6,882,338 B2 | 4/2005 | Flowers |
| 6,888,536 B2 | 5/2005 | Westerman et al. |
| 6,888,538 B2 | 5/2005 | Ely et al. |
| 6,891,531 B2 | 5/2005 | Lin |
| 6,893,724 B2 | 5/2005 | Lin et al. |
| 6,897,673 B2 | 5/2005 | Savage et al. |
| 6,903,402 B2 | 6/2005 | Miyazawa |
| 6,904,570 B2 | 6/2005 | Foote et al. |
| 6,914,547 B1 | 7/2005 | Swaroop et al. |
| 6,933,873 B1 | 8/2005 | Horsley et al. |
| 6,940,291 B1 | 9/2005 | Ozick |
| 6,946,853 B2 | 9/2005 | Gifford et al. |
| 6,949,811 B2 | 9/2005 | Miyazawa |
| 6,949,937 B2 | 9/2005 | Knoedgen |
| 6,958,594 B2 | 10/2005 | Redl et al. |
| 6,970,120 B1 | 11/2005 | Bjornsen |
| 6,970,126 B1 | 11/2005 | O'Dowd et al. |
| 6,975,123 B1 | 12/2005 | Malang et al. |
| 6,993,607 B2 | 1/2006 | Philipp |
| 6,999,009 B2 | 2/2006 | Monney |
| 7,006,938 B2 | 2/2006 | Laraia et al. |
| 7,030,782 B2 | 4/2006 | Ely et al. |
| 7,031,886 B1 | 4/2006 | Hargreaves |
| 7,032,051 B2 | 4/2006 | Reay et al. |
| 7,075,523 B2 * | 7/2006 | Marten et al. ............ 345/173 |
| 7,075,864 B2 | 7/2006 | Kakitsuka et al. |
| 7,078,916 B2 | 7/2006 | Denison |
| 7,098,675 B2 | 8/2006 | Inaba et al. |
| 7,129,714 B2 | 10/2006 | Baxter |
| 7,133,140 B2 | 11/2006 | Lukacs et al. |
| 7,133,793 B2 | 11/2006 | Ely et al. |
| 7,136,051 B2 * | 11/2006 | Hein et al. ............ 345/173 |
| 7,141,968 B2 | 11/2006 | Hibbs et al. |
| 7,141,987 B2 | 11/2006 | Hibbs et al. |
| 7,148,704 B2 | 12/2006 | Philipp |
| 7,151,528 B2 | 12/2006 | Taylor et al. |
| 7,158,056 B2 | 1/2007 | Wright et al. |
| 7,158,125 B2 | 1/2007 | Sinclair et al. |
| 7,202,655 B2 | 4/2007 | Itoh |
| 7,205,777 B2 | 4/2007 | Schulz et al. |
| 7,212,189 B2 | 5/2007 | Shaw et al |
| 7,224,591 B2 | 5/2007 | Kaishita et al. |
| 7,225,090 B2 | 5/2007 | Coley |
| 7,233,508 B2 | 6/2007 | Itoh |
| 7,235,983 B2 | 6/2007 | O'Dowd et al. |
| 7,245,131 B2 | 7/2007 | Kurachi et al. |
| 7,256,588 B2 | 8/2007 | Howard et al. |
| 7,262,609 B2 | 8/2007 | Reynolds |
| 7,271,608 B1 | 9/2007 | Vermeire et al. |
| 7,288,946 B2 | 10/2007 | Hargreaves et al. |
| 7,301,350 B2 | 11/2007 | Hargreaves et al. |
| 7,307,485 B1 | 12/2007 | Snyder et al. |
| 7,312,616 B2 | 12/2007 | Snyder |
| 7,323,879 B2 | 1/2008 | Kuo et al. |
| 7,323,886 B2 | 1/2008 | Lee |
| 7,333,090 B2 | 2/2008 | Tanaka et al. |
| 7,339,580 B2 | 3/2008 | Westerman et al. |
| 7,359,816 B2 | 4/2008 | Kumar et al. |
| 7,375,535 B1 | 5/2008 | Kutz et al. |
| 7,381,031 B2 | 6/2008 | Kawaguchi et al. |
| 7,392,431 B2 | 6/2008 | Swoboda |
| 7,417,411 B2 | 8/2008 | Hoffman et al. |
| 7,417,441 B2 | 8/2008 | Reynolds |
| 7,423,437 B2 | 9/2008 | Hargreaves et al. |
| 7,449,895 B2 | 11/2008 | Ely et al. |
| 7,451,050 B2 | 11/2008 | Hargreaves |
| 7,453,270 B2 | 11/2008 | Hargreaves et al. |
| 7,453,279 B2 | 11/2008 | Corbin, Jr. et al. |
| 7,479,788 B2 | 1/2009 | Bolender et al. |
| 7,495,659 B2 | 2/2009 | Marriott et al. |
| 7,499,040 B2 | 3/2009 | Zadesky et al. |
| 7,504,833 B1 | 3/2009 | Seguine |
| 7,515,140 B2 | 4/2009 | Philipp |
| 7,521,941 B2 | 4/2009 | Ely et al. |
| RE40,867 E | 8/2009 | Binstead |
| 7,598,822 B2 | 10/2009 | Rajagopal et al. |
| 7,683,641 B2 | 3/2010 | Hargreaves et al. |
| 7,812,829 B2 | 10/2010 | Gillespie et al. |
| 7,821,274 B2 | 10/2010 | Philipp et al. |
| 7,911,456 B2 | 3/2011 | Gillespie et al. |
| 7,932,897 B2 | 4/2011 | Elias et al. |
| 8,040,142 B1 | 10/2011 | Bokma et al. |
| 8,068,097 B2 | 11/2011 | Guanghai |
| 8,082,566 B2 | 12/2011 | Stallings |
| 8,089,288 B1 | 1/2012 | Maharita |
| 8,089,289 B1 | 1/2012 | Kremin et al. |
| 8,093,914 B2 | 1/2012 | Maharyta et al. |
| 8,169,238 B1 | 5/2012 | Maharyta et al. |
| 2001/0012667 A1 | 8/2001 | Ma et al. |
| 2002/0000978 A1 | 1/2002 | Gerpheide |
| 2002/0063688 A1 | 5/2002 | Shaw et al. |
| 2002/0067348 A1 | 6/2002 | Masters et al. |
| 2002/0109035 A1 | 8/2002 | Denen et al. |
| 2002/0136372 A1 | 9/2002 | Bozorgui-Nesbat |
| 2002/0140440 A1 | 10/2002 | Haase |
| 2002/0191029 A1 | 12/2002 | Gillespie et al. |
| 2003/0014239 A1 | 1/2003 | Ichbiah et al. |
| 2003/0025679 A1 | 2/2003 | Taylor et al. |
| 2003/0062889 A1 | 4/2003 | Ely et al. |
| 2003/0063073 A1 | 4/2003 | Geaghan et al. |
| 2003/0063428 A1 | 4/2003 | Nishi |
| 2003/0076306 A1 | 4/2003 | Zadesky et al. |
| 2003/0080755 A1 | 5/2003 | Kobayashi |
| 2003/0098858 A1 | 5/2003 | Perski et al. |
| 2003/0156098 A1 | 8/2003 | Shaw et al. |
| 2003/0160808 A1 | 8/2003 | Foote et al. |
| 2003/0178675 A1 | 9/2003 | Nishizaka et al. |
| 2003/0183864 A1 | 10/2003 | Miyazawa |
| 2003/0183884 A1 | 10/2003 | Miyazawa |
| 2003/0184315 A1 | 10/2003 | Eberlein |
| 2003/0189419 A1 | 10/2003 | Maki et al. |
| 2003/0230438 A1 | 12/2003 | Keefer et al. |
| 2003/0232507 A1 | 12/2003 | Chen |
| 2004/0041798 A1 | 3/2004 | Kim |
| 2004/0068409 A1 | 4/2004 | Tanaka et al. |
| 2004/0082198 A1 | 4/2004 | Nakamura et al. |
| 2004/0169594 A1 | 9/2004 | Ely et al. |
| 2004/0178989 A1 | 9/2004 | Shahoian et al. |
| 2004/0178997 A1 | 9/2004 | Gillespie et al. |
| 2004/0183560 A1 | 9/2004 | Savage et al. |
| 2004/0217945 A1 | 11/2004 | Miyamoto et al. |

(56) References Cited

U.S. PATENT DOCUMENTS

| | | |
|---|---|---|
| 2004/0239616 A1 | 12/2004 | Collins |
| 2004/0239650 A1 | 12/2004 | Mackey |
| 2004/0252109 A1 | 12/2004 | Trent et al. |
| 2004/0263864 A1 | 12/2004 | Lukacs et al. |
| 2005/0021269 A1 | 1/2005 | Ely et al. |
| 2005/0024341 A1 | 2/2005 | Gillespie et al. |
| 2005/0031175 A1 | 2/2005 | Hara et al. |
| 2005/0062732 A1 | 3/2005 | Sinclair et al. |
| 2005/0073302 A1 | 4/2005 | Hibbs et al. |
| 2005/0073322 A1 | 4/2005 | Hibbs et al. |
| 2005/0083110 A1 | 4/2005 | Latham et al. |
| 2005/0099188 A1 | 5/2005 | Baxter |
| 2005/0159126 A1 | 7/2005 | Wang |
| 2005/0169768 A1 | 8/2005 | Kawaguchi et al. |
| 2005/0179668 A1 | 8/2005 | Edwards |
| 2005/0270273 A1 | 12/2005 | Marten |
| 2005/0275382 A1 | 12/2005 | Stessman et al. |
| 2005/0280639 A1 | 12/2005 | Taylor et al. |
| 2005/0283330 A1 | 12/2005 | Laraia et al. |
| 2006/0022660 A1 | 2/2006 | Itoh |
| 2006/0026535 A1 | 2/2006 | Hotelling et al. |
| 2006/0032680 A1 | 2/2006 | Elias et al. |
| 2006/0033508 A1 | 2/2006 | Lee |
| 2006/0033724 A1 | 2/2006 | Chaudhri et al. |
| 2006/0038793 A1 | 2/2006 | Philipp |
| 2006/0049834 A1 | 3/2006 | Umeda |
| 2006/0053387 A1 | 3/2006 | Ording |
| 2006/0066585 A1 | 3/2006 | Lin |
| 2006/0097991 A1* | 5/2006 | Hotelling et al. ............. 345/173 |
| 2006/0097992 A1 | 5/2006 | Gitzinger et al. |
| 2006/0108349 A1 | 5/2006 | Finley et al. |
| 2006/0113974 A1 | 6/2006 | Kan et al. |
| 2006/0114247 A1 | 6/2006 | Brown |
| 2006/0139469 A1 | 6/2006 | Yokota et al. |
| 2006/0152739 A1 | 7/2006 | Silvestre |
| 2006/0164142 A1 | 7/2006 | Stanley |
| 2006/0172767 A1 | 8/2006 | Cathey et al. |
| 2006/0176718 A1 | 8/2006 | Itoh |
| 2006/0187214 A1 | 8/2006 | Gillespie et al. |
| 2006/0193156 A1 | 8/2006 | Kaishita et al. |
| 2006/0197750 A1 | 9/2006 | Kerr et al. |
| 2006/0221061 A1* | 10/2006 | Fry ............... 345/173 |
| 2006/0227117 A1 | 10/2006 | Proctor |
| 2006/0232559 A1 | 10/2006 | Chien et al. |
| 2006/0262101 A1 | 11/2006 | Layton et al. |
| 2006/0267953 A1 | 11/2006 | Peterson et al. |
| 2006/0290678 A1 | 12/2006 | Lii |
| 2007/0046299 A1 | 3/2007 | Hargreaves et al. |
| 2007/0069274 A1 | 3/2007 | Elsass et al. |
| 2007/0076897 A1 | 4/2007 | Philipp |
| 2007/0100566 A1 | 5/2007 | Coley |
| 2007/0152983 A1 | 7/2007 | Mckillop et al. |
| 2007/0164756 A1 | 7/2007 | Lee |
| 2007/0173220 A1 | 7/2007 | Kim et al. |
| 2007/0176609 A1 | 8/2007 | Ely et al. |
| 2007/0229469 A1 | 10/2007 | Seguine |
| 2007/0263191 A1 | 11/2007 | Shibazaki |
| 2007/0268243 A1 | 11/2007 | Choo et al. |
| 2007/0268265 A1 | 11/2007 | Xiaoping |
| 2007/0268273 A1 | 11/2007 | Westerman et al. |
| 2007/0268274 A1 | 11/2007 | Westerman et al. |
| 2007/0268275 A1 | 11/2007 | Westerman et al. |
| 2007/0273659 A1 | 11/2007 | Xiaoping et al. |
| 2007/0291013 A1 | 12/2007 | Won |
| 2007/0296709 A1 | 12/2007 | Guanghai |
| 2008/0007529 A1 | 1/2008 | Paun et al. |
| 2008/0007534 A1* | 1/2008 | Peng et al. ............... 345/173 |
| 2008/0036473 A1 | 2/2008 | Jansson |
| 2008/0041639 A1 | 2/2008 | Westerman et al. |
| 2008/0042986 A1 | 2/2008 | Westerman et al. |
| 2008/0042987 A1 | 2/2008 | Westerman et al. |
| 2008/0042988 A1 | 2/2008 | Westerman et al. |
| 2008/0042989 A1 | 2/2008 | Westerman et al. |
| 2008/0047764 A1 | 2/2008 | Lee et al. |
| 2008/0048997 A1 | 2/2008 | Gillespie et al. |
| 2008/0062139 A1* | 3/2008 | Hotelling et al. ............. 345/173 |
| 2008/0062140 A1 | 3/2008 | Hotelling et al. |
| 2008/0068100 A1 | 3/2008 | Goodnow et al. |
| 2008/0116904 A1 | 5/2008 | Reynolds et al. |
| 2008/0128182 A1 | 6/2008 | Westerman et al. |
| 2008/0150906 A1* | 6/2008 | Grivna ............. 345/173 |
| 2008/0158178 A1 | 7/2008 | Hotelling et al. |
| 2008/0162997 A1* | 7/2008 | Vu et al. ............. 714/27 |
| 2008/0165134 A1* | 7/2008 | Krah ............. 345/173 |
| 2008/0278178 A1 | 11/2008 | Philipp |
| 2009/0002206 A1 | 1/2009 | Kremin |
| 2009/0096758 A1 | 4/2009 | Hotelling et al. |
| 2009/0153152 A1 | 6/2009 | Maharyta et al. |
| 2012/0043140 A1 | 2/2012 | Peterson et al. |
| 2012/0043973 A1 | 2/2012 | Kremin |

FOREIGN PATENT DOCUMENTS

| | | |
|---|---|---|
| JP | 04012528 | 1/1992 |
| JP | 05283519 B1 | 10/1993 |
| JP | 6104334 A | 4/1994 |
| JP | 6163528 A | 6/1994 |
| WO | 0002188 A | 1/2000 |

OTHER PUBLICATIONS

USPTO Non-Final Rejection for U.S. Appl. No. 11/442,212 dated Feb. 25, 2011; 13 pages.

USPTO Advisory Action for U.S. Appl. No. 11/437,517 dated Apr. 7, 2010; 3 pages.

USPTO Advisory Action for U.S. Appl. No. 11/442,212 dated Jan. 5, 2011; 3 pages.

USPTO Advisory Action for U.S. Appl. No. 11/442,212 dated Dec. 17, 2009; 3 pages.

USPTO Advisory Action for U.S. Appl. No. 11/477,179 dated Jun. 7, 2010; 3 pages.

USPTO Advisory Action for U.S. Appl. No. 11/512,042 dated Feb. 23, 2011; 3 pages.

USPTO Advisory Action for U.S. Appl. No. 12/332,980 dated Aug. 9, 2011; 3 pages.

USPTO Advisory Action for U.S. Appl. No. 12/367,279 dated Jun. 25, 2010; 3 pages.

USPTO Advisory Action for U.S. Appl. No. 12/395,462 dated Mar. 28, 2012; 2 pages.

USPTO Final Rejection for U.S. Appl. No. 09/975,105 dated Jul. 13, 2006; 7 pages.

USPTO Final Rejection for U.S. Appl. No. 11/273,708 dated Jul. 5, 2007; 8 pages.

USPTO Final Rejection for U.S. Appl. No. 11/337,272 dated Feb. 2, 2007; 11 pages.

USPTO Final Rejection for U.S. Appl. No. 11/395,417 dated Apr. 24, 2007; 9 pages.

USPTO Final Rejection for U.S. Appl. No. 11/437,517 dated Jan. 26, 2010; 11 pages.

USPTO Final Rejection for U.S. Appl. No. 11/442,212 dated Oct. 2, 2009; 12 pages.

USPTO Final Rejection for U.S. Appl. No. 11/442,212 dated Oct. 13, 2010; 13 pages.

USPTO Final Rejection for U.S. Appl. No. 11/477,179 dated Apr. 1, 2010; 10 pages.

USPTO Final Rejection for U.S. Appl. No. 11/477,179 dated Nov. 24, 2010; 10 pages.

USPTO Final Rejection for U.S. Appl. No. 11/484,085 dated Mar. 16, 2010; 7 pages.

USPTO Final Rejection for U.S. Appl. No. 11/502,267 dated Feb. 3, 2009; 10 pages.

USPTO Final Rejection for U.S. Appl. No. 11/512,042 dated Dec. 21, 2010; 7 pages.

USPTO Final Rejection for U.S. Appl. No. 11/600,896 dated Sep. 30, 2010; 19 pages.

USPTO Final Rejection for U.S. Appl. No. 11/601,465 dated Mar. 6, 2009; 11 pages.

USPTO Final Rejection for U.S. Appl. No. 11/601,465 dated Jul. 9, 2008; 10 pages.

(56) References Cited

OTHER PUBLICATIONS

USPTO Final Rejection for U.S. Appl. No. 11/709,897 dated Jul. 29, 2010; 24 pages.
USPTO Final Rejection for U.S. Appl. No. 11/729,818 dated Jul. 2, 2009; 14 pages.
USPTO Final Rejection for U.S. Appl. No. 11/824,249 dated Dec. 22, 2011; 10 pages.
USPTO Final Rejection for U.S. Appl. No. 11/983,291 dated Aug. 12, 2009; 10 pages.
USPTO Final Rejection for U.S. Appl. No. 12/166,228 dated Jan. 4, 2011; 9 pages.
USPTO Final Rejection for U.S. Appl. No. 12/166,228 dated May 28, 2010; 12 pages.
USPTO Final Rejection for U.S. Appl. No. 12/367,279 dated Apr. 1, 2010; 6 pages.
USPTO Final Rejection for U.S. Appl. No. 12/861,812 dated Oct. 18, 2011; 16 pages.
USPTO Non-Final Rejection for U.S. Appl. 09/975,105 dated Jan. 19, 2006; 5 pages.
USPTO Non-Final Rejection for U.S. Appl. No. 09/975,105 dated Apr. 19, 2005; 9 pages.
USPTO Non-Final Rejection for U.S. Appl. No. 11/273,708 dated Mar. 19, 2007; 16 pages.
USPTO Non-Final Rejection for U.S. Appl. No. 11/337,272 dated May 17, 2007; 11 pages.
USPTO Non-Final Rejection for U.S. Appl. No. 11/337,272 dated Oct. 24, 2006; 9 pages.
USPTO Non-Final Rejection for U.S. Appl. No. 11/395,417 dated Apr. 25, 2008; 7 pages.
USPTO Non-Final Rejection for U.S. Appl. No. 11/395,417 dated Oct. 26, 2006; 13 pages.
USPTO Non-Final Rejection for U.S. Appl. No. 11/395,417 dated Nov. 1, 2007; 8 pages.
USPTO Non-Final Rejection for U.S. Appl. No. 11/437,517 dated Aug. 3, 2010; 10 pages.
USPTO Non-Final Rejection for U.S. Appl. No. 11/437,517 dated Aug. 5, 2009; 9 pages.
USPTO Non-Final Rejection for U.S. Appl. No. 11/442,212 dated Mar. 31, 2009; 12 pages.
USPTO Non-Final Rejection for U.S. Appl. No. 11/442,212 dated Jul. 6, 2010; 13 pages.
USPTO Non-Final Rejection for U.S. Appl. No. 11/477,179 dated Jun. 9, 2009; 13 pages.
USPTO Non-Final Rejection for U.S. Appl. No. 11/477,179 dated Jul. 20, 2010; 10 pages.
USPTO Non-Final Rejection for U.S. Appl. No. 11/477,179 dated Nov. 18, 2009; 10 pages.
USPTO Non-Final Rejection for U.S. Appl. No. 11/484,085 dated Sep. 17, 2009; 8 pages.
USPTO Non-Final Rejection for U.S. Appl. No. 11/493,350 dated Jun. 16, 2010; 8 pages.
USPTO Non-Final Rejection for U.S. Appl. No. 11/493,350 dated Nov. 9, 2010; 9 pages.
USPTO Non-Final Rejection for U.S. Appl. No. 11/502,267 dated Aug. 11, 2008; 10 pages.
USPTO Notice of Allowance for U.S. Appl. No. 12/167,100 dated Sep. 1, 2011; 8 pages.
USPTO Notice of Allowance for U.S. Appl. No. 12/167,100 dated Sep. 30, 2010; 7 pages.
USPTO Notice of Allowance for U.S. Appl. No. 12/239,692 dated Jun. 25, 2012; 8 pages.
USPTO Notice of Allowance for U.S. Appl. No. 12/332,980 dated Oct. 4, 2011; 5 pages.
USPTO Notice of Allowance for U.S. Appl. No. 12/367,279 dated Aug. 23, 2010; 7 pages.
USPTO Notice of Allowance for U.S. Appl. No. 12/380,141 dated Jan. 26, 2012; 7 pages.
USPTO Notice of Allowance for U.S. Appl. No. 12/380,141 dated Apr. 10, 2012; 7 pages.
USPTO Notice of Allowance for U.S. Appl. No. 12/380,141 dated May 15, 2012; 7 pages.
USPTO Notice of Allowance for U.S. Appl. No. 12/395,462 dated May 4, 2012; 8 pages.
USPTO Notice of Allowance for U.S. Appl. No. 12/395,462 dated Jul. 20, 2012; 6 pages.
USPTO Notice of Allowance for U.S. Appl. No. 13/664,421 dated Jun. 14, 2013; 9 pages.
USPTO Notice of Allowance, U.S. Appl. No. 11/601,465, dated Apr. 22, 2010, 41 pages.
USPTO Notice of Allowance, U.S. Appl. No. 11/601,465, dated Jun. 28, 2011, 21 pages.
USPTO Notice of Allowance, U.S. Appl. No. 11/601,465, dated Aug. 10, 2010, 17 pages.
USPTO Notice of Allowance, U.S. Appl. No. 11/601,465, dated Nov. 26, 2010, 16 pages.
USPTO Notice of Allowance, U.S. Appl. No. 11/729,818, dated Jan. 26, 2011, 12 pages.
USPTO Notice of Allowance, U.S. Appl. No. 11/729,818, dated May 9, 2011, 8 pages.
USPTO Notice of Allowance, U.S. Appl. No. 11/729,818, dated Jun. 9, 2011, 13 pages.
USPTO Notice of Allowance, U.S. Appl. No. 11/729,818, dated Oct. 5, 2010, 33 pages.
USPTO Notice of Allowance, U.S. Appl. No. 11/729,818, dated Jun. 25, 2010, 7 pages.
USPTO Notice of Allowance, U.S. Appl. No. 13/047,620, dated Apr. 11, 2012, 19 pages.
USPTO Requirement for Restriction for U.S. Appl. No. 12/167,100 dated Aug. 20, 2010; 6 pages.
USPTO Requirement for Restriction for U.S. Appl. No. 12/239,692 dated Sep. 27, 2010; 7 pages.
USPTO Requirement for Restriction for U.S. Appl. No. 12/380,141 dated Jul. 8, 2011; 6 pages.
USPTO Requirement for Restriction/Election for U.S. Appl. No. 11/337,272 dated Sep. 11, 2006; 5 pages.
USPTO Requirement Restriction for U.S. Appl. No. 11/824,249 dated Feb. 17, 2011; 5 pages.
USPTO Restriction Requirement, U.S. Appl. No. 11/601,465, dated Nov. 1, 2007, 5 pages.
USPTO Restriction Requirement, U.S. Appl. No. 13/047,620, dated Feb. 27, 2012, 7 pages.
Van Ess, David; "Simulating a 555 Timer with PSoC," Cypress Semiconductor Corporation, Application Note AN2286, May 19, 2005; 10 pages.
Vladislav Golub, Ph.D., "Sigma-Delta ADCs", pub. date: Jun. 17, 2003, 10 pages.
Wikipedia, The Free Encyclopedia, "IBM PC Keyboard," <http://en.wikipedia.org/wiki/PC_keyboard> accessed May 19, 2006; 3 pages.
Written Opinion of the International Searching Authority for International Application No. PCT/US08/06627 mailed Aug. 26, 2008; 5 pages.
Written Opinion of the International Searching Authority for International Application No. PCT/US08/13622 mailed Feb. 9, 2009; 5 pages.
Written Opinion of the International Searching Authority for International Application No. PCT/US08/60696 mailed Sep. 22, 2008; 4 pages.
USPTO Non-Final Rejection for U.S. Appl. No. 11/600,255 dated Mar. 29, 2010; 10 pages.
USPTO Non-Final Rejection for U.S. Appl. No. 11/600,896 dated May 14, 2010; 15 pages.
USPTO Non-Final Rejection for U.S. Appl. No. 11/600,896 dated Dec. 16, 2009; 13 pages.
USPTO Non-Final Rejection for U.S. Appl. No. 11/601,465 dated Oct. 2, 2008; 10 pages.
USPTO Non-Final Rejection for U.S. Appl. No. 11/601,465 dated Dec. 28, 2007; 16 pages.
USPTO Non-Final Rejection for U.S. Appl. No. 11/700,314 dated Mar. 26, 2010; 7 pages.
USPTO Non-Final Rejection for U.S. Appl. No. 11/709,897 dated Feb. 16, 2010; 21 pages.

(56) References Cited

OTHER PUBLICATIONS

USPTO Non-Final Rejection for U.S. Appl. No. 11/729,818 dated Dec. 17, 2008; 12 pages.
USPTO Non-Final Rejection for U.S. Appl. No. 11/824,249 dated Mar. 30, 2012; 10 pages.
USPTO Non-Final Rejection for U.S. Appl. No. 11/880,963 dated Jun. 12, 2009; 10 pages.
USPTO Non-Final Rejection for U.S. Appl. No. 11/967,243 dated Sep. 17, 2009; 9 pages.
USPTO Non-Final Rejection for U.S. Appl. No. 11/983,291 dated Mar. 9, 2009; 9 pages.
USPTO Non-Final Rejection for U.S. Appl. No. 12/239,692 dated Nov. 29, 2010; 9 pages.
USPTO Non-Final Rejection for U.S. Appl. No. 12/332,980 dated Dec. 22, 2010; 9 pages.
USPTO Non-Final Rejection for U.S. Appl. No. 12/367,279 dated Oct. 29, 2009; 8 pages.
USPTO Non-Final Rejection for U.S. Appl. No. 12/380,141 dated Sep. 19, 2011; 6 pages.
USPTO Non-Final Rejection for U.S. Appl. No. 12/606,147 dated Aug. 23, 2011; 6 pages.
USPTO Non-Final Rejection, U.S. Appl. No. 11/512,042, dated Jul. 13, 2010, 14 pages.
USPTO Notice of Allowance for U.S. Appl. No. 09/975,105 dated Dec. 4, 2006; 4 pages.
USPTO Notice of Allowance for U.S. Appl. No. 09/986,338 dated Feb. 16, 2010; 4 pages.
USPTO Notice of Allowance for U.S. Appl. No. 10/888,666 dated Aug. 2, 2006; 11 pages.
USPTO Notice of Allowance for U.S. Appl. No. 11/273,708 dated Aug. 9, 2007; 4 pages.
USPTO Notice of Allowance for U.S. Appl. No. 11/337,272 dated Aug. 15, 2007; 9 pages.
USPTO Notice of Allowance for U.S. Appl. No. 11/395,417 dated Nov. 6, 2008; 7 pages.
USPTO Notice of Allowance for U.S. Appl. No. 11/484,085 dated Jun. 10, 2010; 4 pages.
USPTO Notice of Allowance for U.S. Appl. No. 11/489,944 dated Apr. 9, 2007; 7 pages.
USPTO Notice of Allowance for U.S. Appl. No. 11/489,944 dated May 24, 2007; 2 pages.
USPTO Notice of Allowance for U.S. Appl. No. 11/600,255 dated Apr. 12, 2012; 7 pages.
USPTO Notice of Allowance for U.S. Appl. No. 11/600,255 dated May 30, 2012; 7 pages.
USPTO Notice of Allowance for U.S. Appl. No. 11/600,255 dated Jun. 16, 2011; 7 pages.
USPTO Notice of Allowance for U.S. Appl. No. 11/600,255 dated Jul. 27, 2010; 6 pages.
USPTO Notice of Allowance for U.S. Appl. No. 11/600,255 dated Dec. 9, 2010; 6 pages.
USPTO Notice of Allowance for U.S. Appl. No. 11/601,465 dated Jan. 11, 2010; 18 pages.
USPTO Notice of Allowance for U.S. Appl. No. 11/601,465 dated May 8, 2009; 6 pages.
USPTO Notice of Allowance for U.S. Appl. No. 11/601,465 dated Sep. 10, 2009; 7 pages.
USPTO Notice of Allowance for U.S. Appl. No. 11/601,465 dated Oct. 7, 2011; 7 pages.
USPTO Notice of Allowance for U.S. Appl. No. 11/700,314 dated Sep. 16, 2010; 8 pages.
USPTO Notice of Allowance for U.S. Appl. No. 11/709,866 dated Feb. 16, 2010; 7 pages.
USPTO Notice of Allowance for U.S. Appl. No. 11/729,818 dated Feb. 24, 2010; 6 pages.
USPTO Notice of Allowance for U.S. Appl. No. 11/729,818 dated Nov. 13, 2009; 7 pages.
USPTO Notice of Allowance for U.S. Appl. No. 11/823,982 dated May 14, 2010; 8 pages.
USPTO Notice of Allowance for U.S. Appl. No. 11/823,982 dated Oct. 6, 2009; 12 pages.
USPTO Notice of Allowance for U.S. Appl. No. 11/880,963 dated Oct. 2, 2009; 4 pages.
USPTO Notice of Allowance for U.S. Appl. No. 11/983,291 dated Mar. 9, 2010; 7 pages.
USPTO Notice of Allowance for U.S. Appl. No. 11/983,291 dated Jun. 21, 2010; 7 pages.
USPTO Notice of Allowance for U.S. Appl. No. 11/983,291 dated Sep. 29, 2010; 7 pages.
USPTO Notice of Allowance for U.S. Appl. No. 11/983,291 dated Oct. 22, 2009; 7 pages.
USPTO Notice of Allowance for U.S. Appl. No. 12/040,387 dated Mar. 29, 2012; 8 pages.
USPTO Notice of Allowance for U.S. Appl. No. 12/167,100 dated Jan. 12, 2011; 8 pages.
USPTO Notice of Allowance for U.S. Appl. No. 12/167,100 dated Jun. 28, 2011; 8 pages.
"CSD User Module Data Sheet," CSD v1.0, Oct. 23, 2006; 58 pages.
"Sigma-Delta ADCs and DACs, AN-283 Application Note, Analog Devices," 1993; Downloaded from <http://www.analog.com/UpoloadedFiles/Application_Notes/292524291525717245054923680458171AN283.pdf>; 16 pages.
"The Virtual Keyboard: I-Tech Bluetooth/Serial Virtual Laser Keyboard Available Now?" The Virtual Laser Keyboard (VKB) Online Worldwide Shop, <http://www.virtual-laser-keyboard.com>, downloaded Apr. 13, 2006; 4 pages.
Andrew S. Tanebaum with contributions from James R. Goodman, "Structured Computer Organization", 1999, Prentice Hall, Fourth Edition, pp. 264-288, 359-362.
U.S. Appl. No. 13/047,620 "Touch Detection Techniques for Capacitive Touch Sense Systems", filed Mar. 14, 2011, 38 pages.
U.S. Appl. No. 13/049,798: "Capacitance to Code Converter With Sigma-Delta Modulator," Kremin, filed Mar. 16, 2011; 77 pages.
U.S. Appl. No. 11/493,350: "Technique for Increasing the Sensitivity of Capacitive Sensor Arrays," Lee et al., filed Jul. 25, 2006; 48 pages.
U.S. Appl. No. 11/600,255: "Capacitance to Code Converter With Sigma-Delta Modulator," Kremin, filed Nov. 14, 2006; 102 pages.
U.S. Appl. No. 11/709,897: "Preventing Unintentional Activation of a Sensor Element of a Sensing Device," Jason Konstas; filed Feb. 21, 2007; 97 pages.
U.S. Appl. No. 12/197,466: "Radical Oxidation Process for Fabricating a Nonvolatile Charge Trap Memory Device," Ramkumar et al., filed Aug. 25, 2008; 68 pages.
U.S. Appl. No. 12/380,141: "Capacitive field sensor with sigma-delta modulator," Rystun et al., filed Feb. 23, 2009; 48 pages.
U.S. Appl. No. 12/606,147: "Methods and Circuits for Measuring Mutual and Self Capacitance," Andriy Maharyta, filed Oct. 26, 2009; 49 pages.
U.S. Appl. No. 12/618,661: "Automatic Tuning of a Capacitive Sensing Device," Dana Olson, filed Nov. 13, 2009; 30 pages.
U.S. Appl. No. 12/861,812: "Capacitance Measurement Systems and Methods", filed Aug. 23, 2010, 24 pages.
U.S. Appl. No. 13/191,806: "Capacitance Measurement Systems and Methods", filed Jul. 27, 2011, 38 pages.
U.S. Appl. No. 13/345,504 "Compensation Circuit for a TX-RX Capacitive Sensor", filed Jan. 6, 2012, 56 pages.
U.S. Appl. No. 60/220,921: "Method for Automatically Tuning a Capacitive Sensing Device," Dana Olson, filed Jun. 26, 2009; 13 pages.
U.S. Appl. No. 61/016,123 "Capacitive Field Sensor With Sigma-Delta Modulator" filed Dec. 21, 2007, 23 pages.
U.S. Appl. No. 61/023,988: "Touch Sensing" Jon Peterson, et al., filed Jan. 28, 2008; 26 pages.
U.S. Appl. No. 61/024,158 "Multi-Touch Sensing Method With Differential Input" Dana Olson et al., filed Jan. 28, 2008; 19 pages.
U.S. Appl. No. 61/067,539 "Methods and Circuits for Measuring Mutual and Self Capacitance" Andriy Maharyta et al., filed Feb. 27, 2008; 40 pages.
U.S. Appl. No. 61/067,743 "Multi-Touch Sensing Method with Differential Input" Dana Olson et al., filed Feb. 29, 2008; 19 pages.
U.S. Appl. No. 13/342,942 "Capacitive Field Sensor With Sigma-Delta Modulator", filed Jan. 3, 2012, 37 pages.

(56) References Cited

OTHER PUBLICATIONS

Chapweske, Adam; "The PS/2 Mouse Interface," PS/2 Mouse Interfacing, 2001, retrieved on May 18, 2006; 11 pages.

Cypress Semiconductor Corporation, "Cypress Introduces PSoC(TM)-Based Capacitive Touch Sensor Solution," Cypress Press Release; May 31, 2005; <http://www.cypress.com/portal/server>; retrieved on Feb. 5, 2007; 4 pages.

Cypress Semiconductor Corporation, "FAN Controller CG6457AM and CG6462AM," PSoC Mixed Signal Array Preliminary Data Sheet; May 24, 2005; 25 pages.

Cypress Semiconductor Corporation, "PSoC CY8C20x34 Technical Reference Manual (TRM)," PSoC CY8C20x34 TRM, Version 1.0, 2006; 218 pages.

Cypress Semiconductor Corporation, "PSoC Mixed-Signal Controllers," Production Description; <http://www.cypress.com/portal/server>; retrieved on Sep. 27, 2005; 2 pages.

Cypress Semiconductor Corporation, "Release Notes sm017," Jan. 24, 2007; 3 pages.

Dave Van Ess, "Understanding Switched Capacitor Analog Blocks," Application Note AN2041, Mar. 30, 2004; 16 pages.

Dennis Seguine, "Capacitive Switch Scan," AN2233a, Application Note, CY8C21x34, Apr. 7, 2005; 6 pages.

International Search Report for International Application No. PCT/US05/23468 dated Aug. 25, 2006; 2 pages.

International Search Report for International Application No. PCT/US08/13622 dated Feb. 9, 2009; 2 pages.

International Written Opinion of the International Searching Authority, dated Feb. 9, 2009 for International Application No. PCT/US2008/013622; 5 pages.

Janusz Mlodzianowski, "A Simple Multipurpose Logic Analyzer," Dec. 1997, Circuit Cellar Ink, Issue 89, pp. 28-36.

Kremin, V. "Noise resistant capacitive sensor," U.S. Appl. No. 11/824,4249, filed Jun. 29, 2007; 41 pages.

Larry K. Baxter, "Capacitive Sensors, Design and Applications," IEEE Press, The Institute of Electrical and Electronics Engineers Inc., Aug. 1996, pp. 177-187; 12 pages.

Lee, Mark; "EMC Design Considerations for PSoC CapSense Applications," Cypress Semiconductor Corporation, Application Note AN2318; Sep. 16, 2005; 6 pages.

Mark Lee, "CapSense Best Practices," Cypress Semiconductor Application Note, Oct. 16, 2006; 10 pages.

Milton Ohring, "The Materials Science of Thin Films: Deposition and Structure," 2nd Edition, Academic Press, 2002, pp. 336-337; 4 pages.

Min et al., "Offset Compensation of Capacitive Sensors for Electrostatic Microactuators," ISIE 2001, Pusan Korea, pp. 2114-2117.

Ryan Seguine et al, "Layout Guidelines for PSoC CapSense", Cypress Application Note AN2292, Revision B, Oct. 31, 2005; all pages.

Sangil Park, "Motorola Digital Signal Processors, Principles of Sigma-Delta Modulation for Analog-to-Digital Converters," Rev. 1, downloaded from <http://digitalsignallabs.com/SigmaDelta.pdf>, Mar. 1997; 64 pages.

Sedra, Adel S. et al., "Microelectronic Circuits," 3rd Edition, Oxford University Press, pp. xiii-xx and 861-883, 1991; 20 pages.

Ted Tsui, "Migrating from CSR to CSD," Cypress Semiconductor Corporation, Application Note AN2408, Feb. 8, 2007, http://www.cypress.com.

The Authoritative Dictionary of IEEE Standards Terms, 2000, IEEE Press Publications, 7th Edition, pp. 1133-1134; 4 pages.

The Written Opinion of the International Searching Authority for International Application No. PCT/US05/23468 dated Aug. 25, 2006; 7 pages.

USPTO Advisory Action for U.S. Appl. No. 11/337,272 dated Apr. 3, 2007; 3 pages.

USPTO Advisory Action for U.S. Appl. No. 11/395,417 dated Jul. 6, 2007; 3 pages.

U.S. Appl. No. 12/239,692 (CD08019): "System and Method to Measure Capacitance of Capacitive Sensor Array" Nathan Mayal et al., filed on Sep. 26, 2008; 36 pages.

USPTO Final Rejection for U.S. Appl. No. 12/239,692 (CD08019) dated May 9, 2011; 10 pages.

USPTO Notice of Allowance for U.S. Appl. No. 12/239,692 (CD08019) dated Oct. 13, 2011; 8 pages.

USPTO Non Final Rejection for U.S. Appl. No. 13/670,671 (CD08019C1) dated Sep. 12, 2014; 11 pages.

USPTO Non Final Rejection for U.S. Appl. No. 13/670,671 (CD08019C1) dated Dec. 29, 2014; 8 pages.

USPTO Final Rejection for U.S. Appl. No. 13/670,671 (CD08019C1) dated May 11, 2015; 13 pages.

\* cited by examiner

MULTI-TOUCH SENSING METHOD

RELATED APPLICATION

This application claims the benefit of U.S. Provisional Application No. 61/067,743 filed Feb. 29, 2008.

TECHNICAL FIELD

The present disclosure relates generally to touch sensor devices and, more particularly, to resolving multi-touches on a multi-touch sensor device.

BACKGROUND

One type of touchpad operates by way of capacitance sensing utilizing capacitance sensors. The capacitance detected by a capacitance sensor changes as a function of the proximity of a conductive object to the sensor. The conductive object can be, for example, a stylus or a user's finger. In a touch-sensor device, a change in capacitance detected by each sensor in the X and Y dimensions of the sensor array due to the proximity or movement of a conductive object can be measured by a variety of methods. Regardless of the method, usually an electrical signal representative of the capacitance detected by each capacitive sensor is processed by a processing device, which in turn produces electrical or optical signals representative of the position of the conductive object in relation to the touch-sensor pad in the X and Y dimensions. A touch-sensor strip, slider, or button operates on the same capacitance-sensing principle.

A first type of touchpad is composed of a matrix of rows and columns. Within each row or column there are multiple sensor elements, however, all sensor pads within each row or column are coupled together and operate as one long sensor element. The number of touches a touchpad can detect is not the same as the resolution of the touchpad. For example, even though a touchpad may have the capability to detect two substantially simultaneous touches with an XY matrix, the touchpad cannot resolve the location of the two substantially simultaneous touches.

One way to resolve the location of a second touch is if the touches arrive sequentially in time. If both touches arrive or are detected substantially simultaneously, however, there is no way to resolve which of the two pairs of potential locations constitute "actual" touches, instead of invalid touches (e.g., "ghost" touches). Thus, the two-axis touchpads are configured to resolve only a location of a single touch. Similarly, touch screens are designed to detect the presence and location of a single touch.

BRIEF DESCRIPTION OF THE DRAWINGS

Embodiments of the present invention are illustrated by way of example and not intended to be limited by the figures of the accompanying drawings in which like references indicate similar elements and in which:

FIGS. 6a-6d illustrate the use of a single row as a reference for differential measurements according to an embodiment of the present invention.

DETAILED DESCRIPTION

In the following description, for purposes of explanation, numerous specific details are set forth in order to provide a thorough understanding of embodiments of the present invention. It will be evident, however, to one skilled in the art that the present invention may be practiced without these specific details. In other instances, well-known circuits, structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. It should be noted that the apparatus and methods may be discussed herein in relation to a touch pad for ease of explanation purposes and that embodiments of the present invention are not limited to use just with touch pads but may also be used with other touch sensitive devices such as a touch screen.

An apparatus and method of capacitive sensing utilizing a capacitance sensor measurement circuit is described. In one embodiment, the capacitance sensor measurement circuit includes a voltage subtractor (e.g., a differential amplifier) that rejects common signals between the columns or rows of the touch sensor matrix depending on which are driven and which are being sensed. Differential scanning may also reduce the number scans that may be used to cover an entire touch panel, for example, (N−1)*M scans may be deployed to cover a panel with N columns and M rows of sensors. For example, with a matrix of 10×15 sensing elements, one touch sensor may use 150 scans whereas one embodiment of the present invention may use, for example, 135 scans.

Figure 1A:
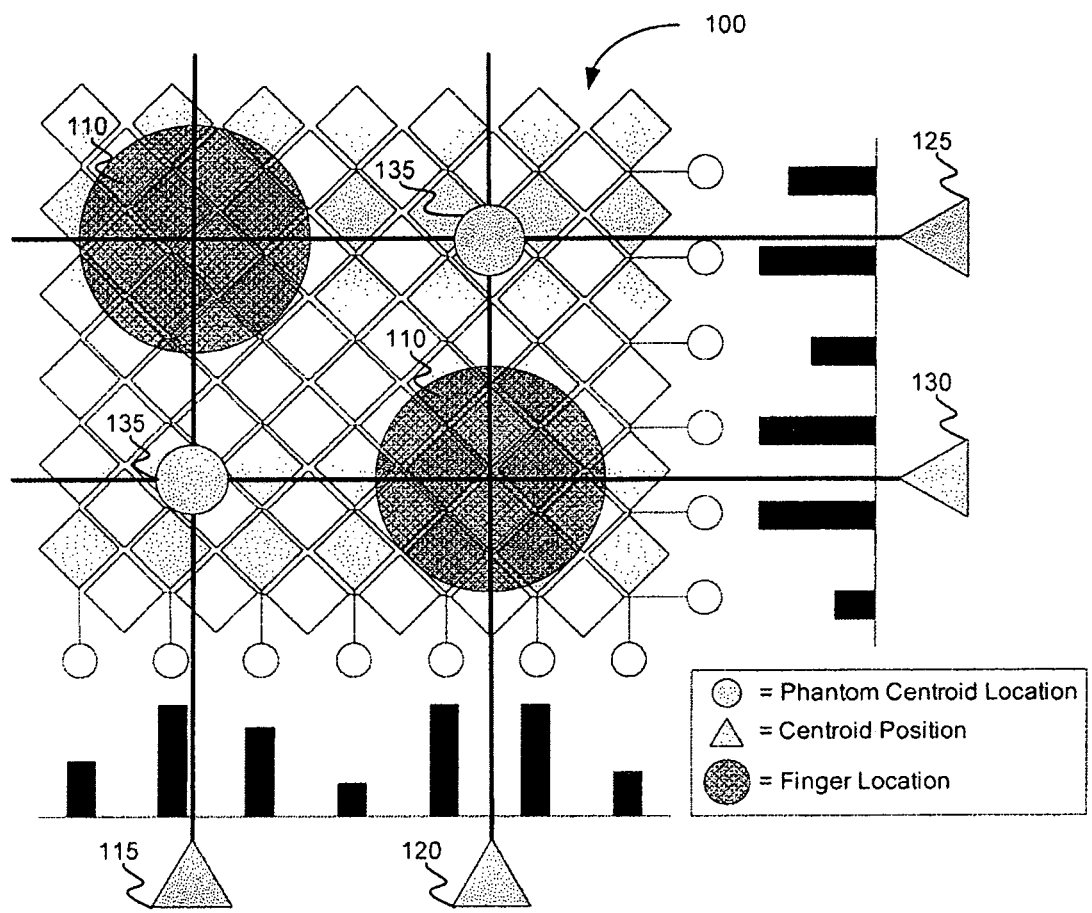
FIG. 1A illustrates multiple finger presses on a touch pad according to an embodiment.

FIG. 1A illustrates multiple simultaneous finger presses on a touchpad according to an embodiment. The touchpad 100 senses an increase in capacitance attributable to each finger press 110. The capacitance is measured along each vertical column and each horizontal row. For example, when there are two simultaneous finger presses 110 on a touchpad 100, there are two columns 115, 120 that detect an increase in capacitance. The increase in capacitance is illustrated by the taller bars along the x-axis near columns 115 and 120. Likewise, there are two corresponding rows 125, 130 that also detect an increase in capacitance, which is similarly illustrated. As a result, there are four intersections where a column and row both detect an increase in capacitance. These intersections represent potential touch locations. The potential touch locations are evaluated to determine which locations are "actual touch" locations and which are invalid touches, also referred to as "ghost touch" locations or "phantom" locations 135.

Figure 1B:
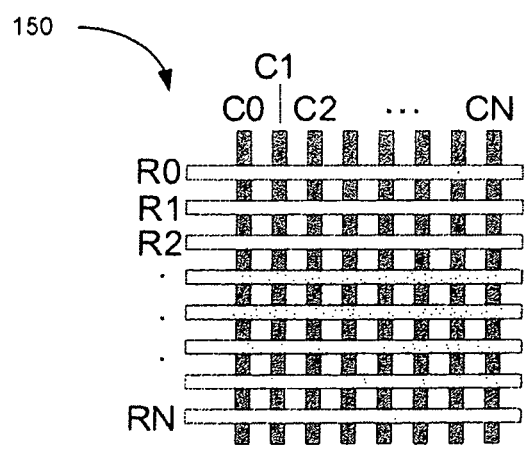
FIG. 1B illustrates one embodiment of a capacitive sensor matrix.

FIG. 1B illustrates one embodiment of a capacitive sensor matrix 150. The row conductors (R0-RN) and column conductors (C0-CN) are arranged to overlap, creating a matrix of intersections. Various methods of capacitive sensing, including those that are capable of multi-touch sensing, resolve the capacitance at the junction between a row and a column. In addition, various known circuitry may be used to implement detection of capacitive sensor activation. For example, such detection may be performed by utilizing a capacitive switch relaxation oscillator (CSR). The CSR may be coupled to an array of sensor elements using a current-programmable relaxation oscillator, an analog multiplexer, digital counting functions, and high-level software routines as discussed in further detail below. However, it should be noted that there are various known methods for measuring capacitance with a capacitance sensor. The present embodiments are not limited to using relaxation oscillators, but may include other methods known in the art, such as current versus voltage phase shift measurement, resistor-capacitor charge timing, capacitive bridge dividers, charge transfer, sigma-delta modulators, charge-accumulation circuits, or the like. Additional details regarding these alternative embodiments are not included so as to not obscure the present embodiments.

Figure 2:
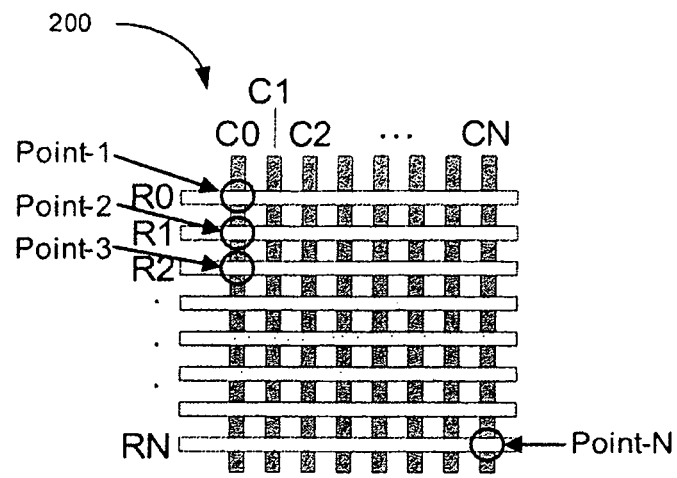
FIG. 2 illustrates multiple touch points that are to be resolved according to an embodiment.
Figure 3:
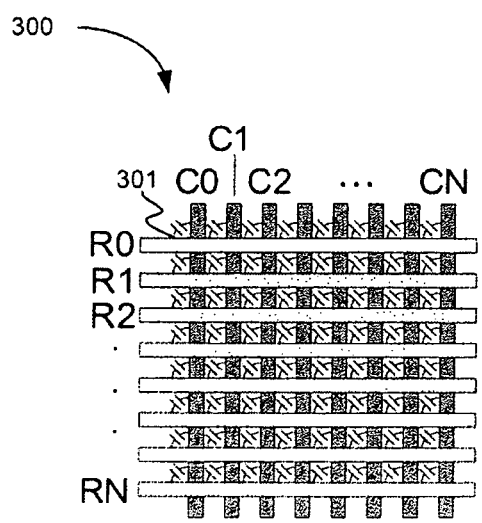
FIG. 3 illustrates the coupling capacitance between rows and columns according to an embodiment.

FIG. 2 illustrates multiple touch points that are to be resolved using embodiments of the present invention and FIG. 3 illustrates the coupling capacitance between rows and columns according to embodiments of the present invention. When a conductive object, such as a finger, is placed at an intersection (Point-1-Point-N) of rows R0-RN and columns C0-CN in touchpad matrix 200, the row to column coupling capacitance is changed at that intersection. The coupling capacitance 301 is illustrated between the rows R0-RN and columns C0-CN in touchpad matrix 300. A capacitance sensor is used to measure the capacitance change when a conductive object is placed on or near the touchpad. The change in capacitance at the intersection is used to determine the location of the conductive object, as described further below.

Figure 4:
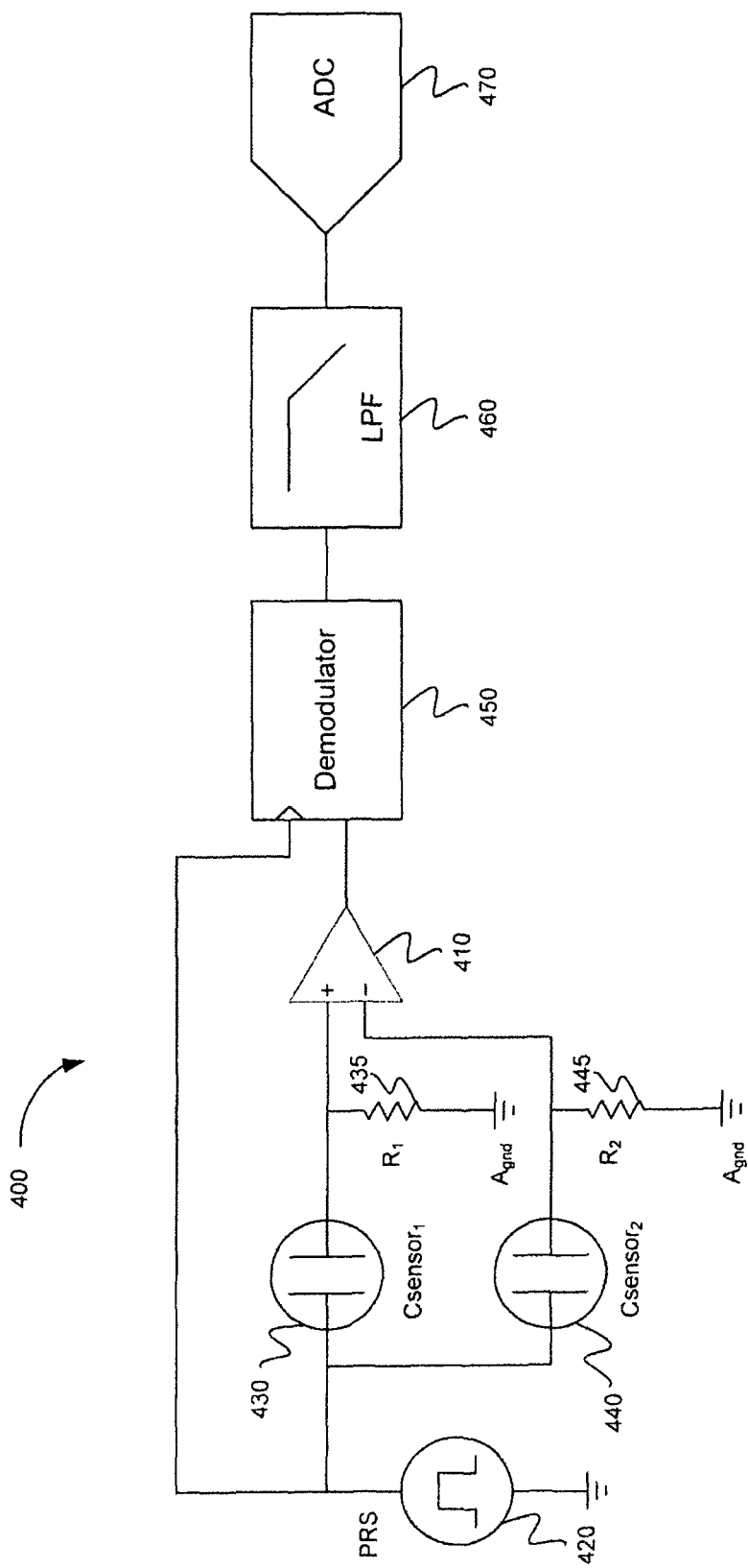
FIG. 4 illustrates a capacitance measurement sensor having a differential amplifier according to one embodiment of the present invention.

FIG. 4 illustrates a capacitance measurement sensor 400 having a differential amplifier 410 according to one embodiment of the present invention. In one embodiment, the capacitance measurement sensor 400 includes a drive circuit configured to generate a drive signal. In one embodiment, the drive circuit is a pseudo-random sequence generator (PRS) 420 that provides an alternating current (AC) signal that is coupled across two sensor capacitances (Csensor$_1$ and Csensor$_2$) 430, 440. The sensor capacitances are coupled between the rows and columns of the touch pad sensor matrix illustrated in FIG. 3.

The intersection of a column with a row, for example column C0 with row R1, forms a Csensor. The impedance of a Csensor 430, 440 in series with the resistor R (e.g., R$_1$ or R$_2$) 435, 445 forms a voltage divider. In one illustrative embodiment, the intersection of column C0 with row R1 forms Csensor$_1$ 430. The intersection of column C0 with an adjacent row, for example row R2, forms Csensor$_2$ 440. Thus, a voltage divider is formed by Csensor$_1$ 430 and resistor R$_1$ 435. For a given frequency F, Csensor$_1$ 430 will have an impedance Z1=1/(F*Csensor$_1$). The voltage across resistor R$_1$ 435 can then be calculated to be:

$$VR_1 = \frac{R_1}{R_1 + Z_1} * V_{PRS} = \frac{R_1}{R_1 + \frac{1}{F * Csensor_1}} * V_{PRS} \quad (1)$$

Therefore, a change in Csensor$_1$ will directly result in a change in voltage across R$_1$ (VR$_1$).

A second voltage divider is formed with Csensor$_2$ 440 and resistor R$_2$ 445. As a finger, or other conductive object, comes near the sensor area, the capacitance changes due to the coupling to ground (Agnd). When the capacitance decreases, less of the PRS signal is dropped across the resistors (e.g., R$_1$ and R$_2$). It should be noted that in alternative embodiments, other elements may be used instead of resistors to form the voltage dividers, for example, capacitors.

The drive signal is applied to the first and second voltage dividers and a difference signal is generated based on a difference between an output of the first voltage divider and an output of the second voltage divider. In this embodiment, the capacitance measurement sensor has a differential amplifier 410 as a voltage subtraction circuit. The differential amplifier in this first stage rejects noise signals common to both sensor capacitors (e.g., Csensor$_1$ and Csensor$_2$). The differential amplifier is coupled so as to subtract the voltage present on two adjacent sensors. In one embodiment, a first input of the voltage subtractor is coupled to the first voltage divider and a second input is coupled to the second voltage divider. The voltage subtractor is configured to generate a difference signal based on a difference in capacitance signals from the first and second capacitance sensors. With no finger on the sensor panel, the voltages VR$_1$ and VR$_2$ will be roughly equal. The differential amplifier 410 will subtract the two equal AC voltages and have a near zero output. In one embodiment, this near zero output will be passed through an amplitude detect circuit coupled to receive the difference signal from the voltage subtractor and the drive signal and a lowpass filter 460 and then an analog to digital converter (ADC) 470 will measure zero, as discussed in further detail below. In one embodiment the amplitude detect circuit is a demodulator 450. The amplitude detect circuit is configured to reject noise in the difference signal that is out of phase with the drive signal. The filter 460 is coupled to an output of the amplitude detect circuit to reject out of band noise that may be in phase with the drive signal. The ADC 470 is coupled to an output of the filter. In an alternative embodiment, the differential amplifier 410 may be replaced with another type of voltage subtractor. In one alternative embodiment, for example, the voltage subtractor may be composed of two analog-to-digital blocks. The subtraction is performed by digital processing and then converted back to an analog output signal. As another example, the subtractor may be composed of two voltage-to-current converters, where the currents are subtracted before being converted to a difference voltage.

In one embodiment, when a finger is present on the sensor panel close to Csensor$_1$, the capacitance of Csensor$_1$ may be different than that of Csensor$_2$. This results in VR$_1$ being larger than VR$_2$. The output of the differential amplifier 410 will be the difference between VR$_1$ and VR$_2$. This output may be a small amplitude signal very similar to the PRS drive signal.

The difference between the two sensor capacitor signals (i.e., the output of the differential amplifier) and the PRS drive signal are provided to a demodulator 450. The demodulator 450 rejects noise in the difference signal that is out of phase with the PRS drive signal using synchronous rectification. In one embodiment, such noise rejection is performed by multiplying the difference signal by the sign of the PRS signal, to perform a synchronous rectification of the difference signal. The rectified signal is a pulsing DC signal that represents the peak-to-peak amplitude of the AC signal input to the demodulator 450. This type of demodulator can be thought of as a coherent modulator. It accepts signal components that are in phase with the touch panel drive signal. Out of phase or non-correlated noise signals are chopped. In an alternative embodiment, the demodulator may be replaced with another type of amplitude detection circuit.

In one embodiment, the output of the demodulator 450 is coupled to a low pass filter (LPF) 460. The rectified signal output from the demodulator 450 is lowpass filtered by the LPF 460. The LPF 460 rejects out of band noise that may be in phase with the drive signal. Low pass filtering rejects high frequency noise, and non-correlated low frequency signals that have been frequency shifted by the demodulator to be high frequency noise. The output of the LPF 460 is then measured by an analog-to-digital converter (ADC) 470. The ADC converts the difference signal to a digital signal. When the finger is close to $Csensor_1$, the ADC 470 will measure a positive value. When the finger is close to $Csensor_2$, the ADC 470 will measure a negative value. It should be noted that the design of the PRS, LPF, demodulator and ADC are well known in the art.

Figure 5:
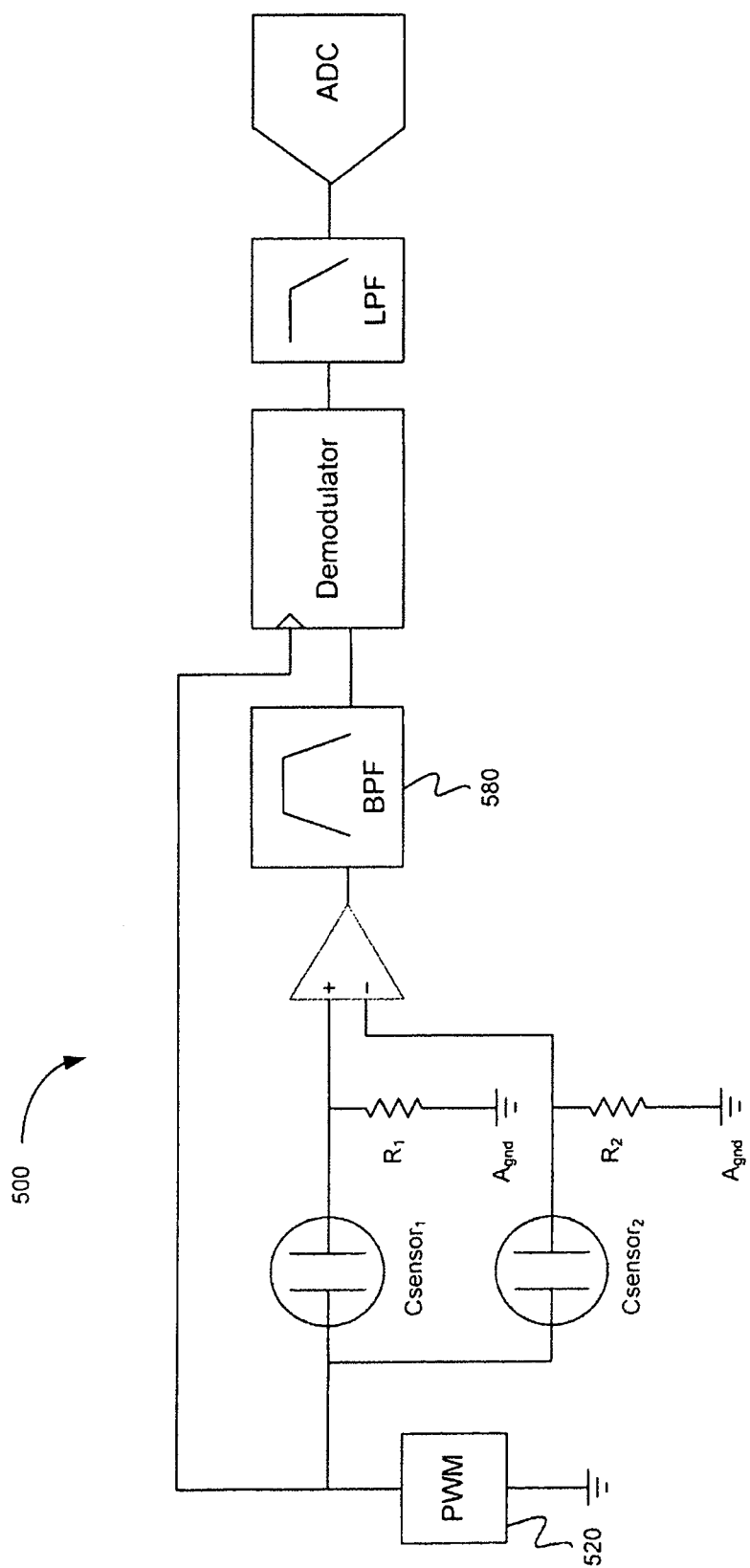
FIG. 5 illustrates a capacitance measurement sensor having a differential amplifier according to an alternative embodiment of the present invention.

It should be noted that in alternative embodiments, the capacitance measurement circuit illustrated in FIG. 4 may include other circuit blocks such as modulation blocks, amplifiers or filters that may be used, for example, to improve the measurement of the circuit. Alternatively, other configurations for a capacitance measurement circuit having a differential amplifier may be used. For example, in one alternative embodiment, the PRS generator may be replaced with another type of drive circuit such as a pulse width modulator (PWM) or a clock (CLK) circuit. FIG. 5 illustrates an alternative embodiment of a capacitance measurement circuit 500 where the drive circuit 520 is a pulse width modulator circuit. In this embodiment, a bandpass filter 580 is included between the output of the differential amplifier and the input of the demodulator. The bandpass filter rejects out of band noise in the difference signal.

Figures 6A, 6B, 6C, 6D:
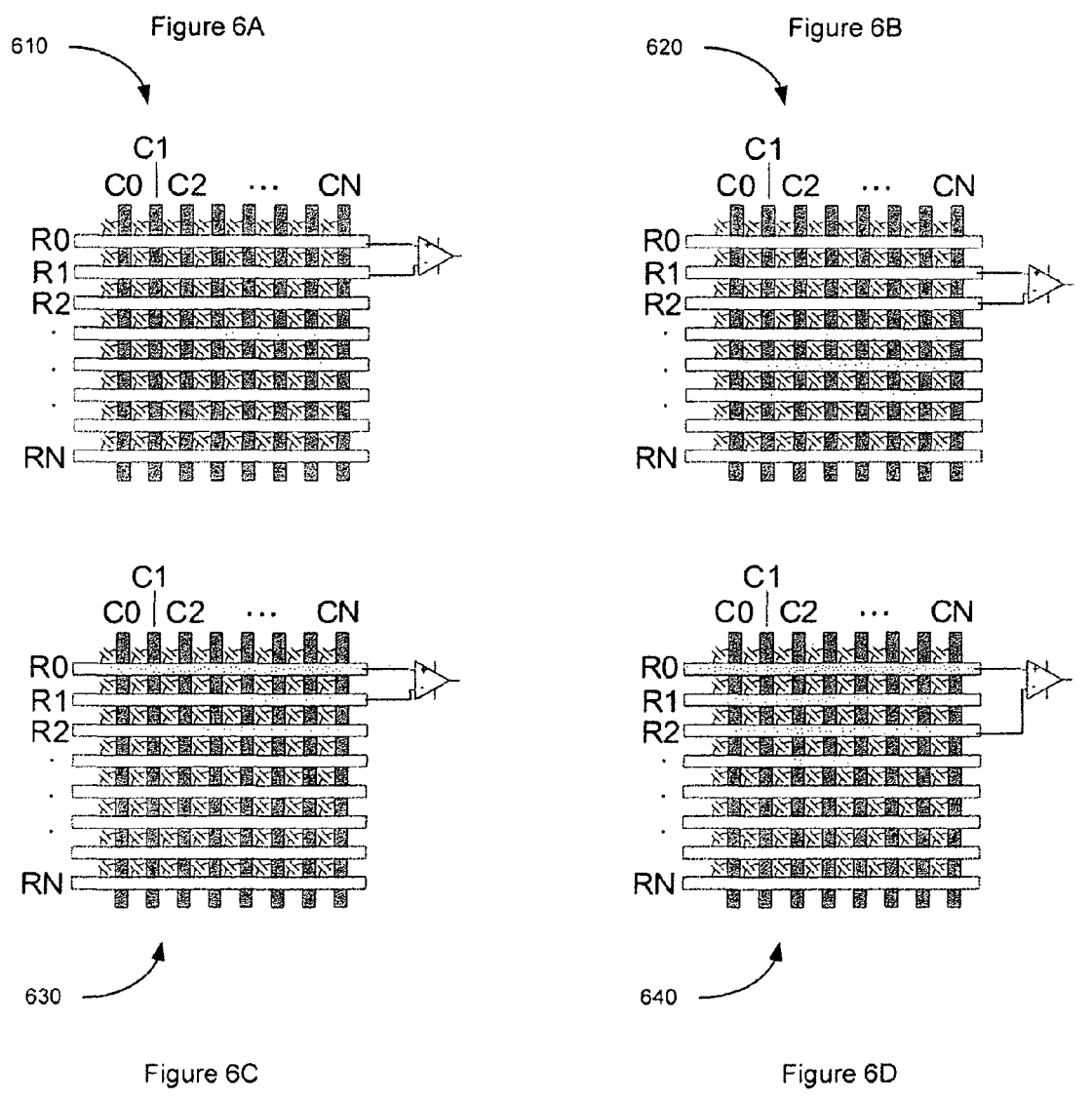

In another alternative embodiment, a single row (or column) may be used as a reference for all other rows (or columns) being sensed, as illustrated in FIGS. 6a-6d. FIG. 6a shows a touchpad matrix 610 with adjacent row difference measurements using adjacent rows R0 and R1. FIG. 6b shows a touchpad matrix 620 with adjacent row difference measurements using adjacent rows R1 and R2. Similarly, any one row of the touchpad matrix may be used as a reference for any other row. In the examples of FIGS. 6c and 6d, row R0 is used as the fixed reference row for the difference measurement against row R1 of touchpad matrix 630 in FIG. 6c and row R2 of touchpad matrix 640 in FIG. 6d.

Some embodiments may include the ability to perform voltage mode sensing that is insensitive to panel row and column resistance. Additionally, differential measurement that is insensitive to parasitic capacitance of a touch panel and differential measurement that reduces the specified measurement dynamic range, thereby providing an optimal signal-to-noise ratio at a faster scan rate, are possible.

Although the present invention has been described with reference to specific embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus comprising:
   a drive circuit to generate a drive signal on a first plurality of sensor elements oriented in a first direction;
   a second plurality of sensor elements oriented in a second direction, wherein intersections of the first plurality of sensor elements and the second plurality of sensor elements form a plurality of sensor locations;
   a first voltage divider coupled to a first sensor element of the second plurality of sensor elements and coupled to ground, wherein the first voltage divider is configured to decrease a first voltage at the first sensor element to a second voltage at an output of the first voltage divider;
   a second voltage divider coupled to a second sensor element of the second plurality of sensor elements and coupled to the ground, wherein the second voltage divider is configured to decrease a third voltage at the second sensor element to a fourth voltage at an output of the second voltage divider;
   a voltage subtractor comprising a first input coupled to the output of the first voltage divider and a second input coupled to the output of the second voltage divider, the voltage subtractor configured to generate a difference signal based on a difference in measured signals on the first sensor element and the second sensor element, wherein the measured signals represent mutual capacitances at the intersections of the first sensor element and the second sensor element, wherein, responsive to proximity of a conductive object closer to the first sensor element than the second element, the difference signal is a positive signal, and wherein, responsive to proximity of the conductive object closer to the second sensor element than the first element, the difference signal is a negative signal; and
   an amplitude detect circuit configured to receive the drive signal and to receive the difference signal, the amplitude detect circuit configured to reject noise in the difference signal that is out of phase with the drive signal.

2. The apparatus of claim 1, wherein the amplitude detect circuit is configured to perform synchronous rectification of the difference signal to reject noise in the difference signal that is out of phase with the drive signal, wherein the amplitude detect circuit is configured to multiply the difference signal by the sign of the drive signal to perform the synchronous rectification.

3. The apparatus of claim 2, further comprising:
   a filter coupled to an output of the amplitude detect circuit to reject out of band noise that may be in phase with the drive signal; and
   an analog to digital converter coupled to an output of the filter.

4. The apparatus of claim 3, wherein the filter comprises a low pass filter.

5. The apparatus of claim 2, wherein the amplitude detect circuit is a demodulator and wherein the demodulator is configured to reject noise in the difference signal using synchronous rectification.

6. The apparatus of claim 2, wherein the drive circuit comprises a pseudorandom sequence generator (PRS).

7. The apparatus of claim 2, wherein the drive circuit comprises a pulse-width modulator (PWM) circuit.

8. The apparatus of claim 2, further comprising a band pass filter coupled between the voltage subtractor and the amplitude detect circuit.

9. The apparatus of claim 1, wherein the voltage subtractor is a differential amplifier.

10. A method comprising:
    providing a drive circuit to generate a drive signal on a first plurality of sensor elements oriented in a first direction;
    providing a second plurality of sensor elements oriented in a second direction, wherein intersections of the first plurality of sensor elements and the second plurality of sensor elements form sensor locations;
    applying the drive signal to a first voltage divider coupled to a first sensor element of the second plurality of sensor elements and coupled to ground;

decreasing a first voltage at the first sensor element to a second voltage at an output of the first voltage divider;

applying the drive signal to a second voltage divider coupled to a second sensor element of the second plurality of sensor elements and coupled to the ground;

decreasing a first voltage at the second sensor element to a second voltage at an output of the second voltage divider;

generating a difference signal based on a difference in the measured signals on the first sensor element and the second sensor element, wherein the measured signals represent mutual capacitances at the intersections of the first plurality of sensor element elements and the second plurality of sensor element elements, wherein, responsive to proximity of a conductive object closer to the first sensor element than the second element, the difference signal is a positive signal, and wherein, responsive to proximity of the conductive object closer to the second sensor element than the first element, the difference signal is a negative signal; and rejecting noise in the difference signal that is out of phase with the drive signal through multiplying the difference signal by the sign of the drive signal.

11. The method of claim 10, wherein generating a difference signal comprises subtracting the output of the second voltage divider from the output of the first voltage divider.

12. The method of claim 10, wherein the rejecting of the noise in the difference signal that is out of phase with the drive signal includes multiplying the difference signal by the sign of the drive signal to perform a synchronous rectification of the difference signal.

13. The method of claim 12, wherein rejecting noise comprises using synchronous rectification.

14. The method of claim 10, further comprising rejecting out of band noise in the difference signal that is in phase with the drive signal.

15. The method of claim 14, wherein rejecting out of band noise comprises low-pass filtering the difference signal.

16. The method of claim 10, further comprising converting the difference signal to a digital signal.

17. A system comprising:

a capacitive sensor array comprising columns and rows of sensor elements, wherein the intersections of the columns and the rows form sensor locations, and wherein the columns of sensor elements form a first plurality of sensor elements and the rows of sensor elements form a second plurality of sensor elements;

a first voltage divider coupled to a first sensor element of the second plurality of sensor elements and coupled to ground, wherein the first voltage divider is configured to decrease a first voltage at the first sensor element to a second voltage at an output of the first voltage divider;

a second voltage divider coupled to a second sensor element of the second plurality of sensor elements and coupled to the ground, wherein the second voltage divider is configured to decrease a third voltage at the second sensor element to a fourth voltage at an output of the second voltage divider;

a voltage subtractor comprising a first input coupled to the first voltage divider and a second input coupled to the second voltage divider, the voltage subtractor configured to generate a difference in measured signals on the first sensor element and the second sensor element, wherein the measured signals represent mutual capacitances, responsive to a drive signal, at the intersections of the first sensor element and the second sensor element, wherein, responsive to proximity of a conductive object closer to the first sensor element than the second element, the difference signal is a positive signal, and wherein, responsive to proximity of the conductive object closer to the second sensor element than the first element, the difference signal is a negative signal; and an amplitude detect circuit coupled to the voltage subtractor and configured to reject a signal generated by both a column and a row of the capacitive sensor array, which is out of phase with the drive signal.

18. The system of claim 17, wherein a single column of the capacitive sensor array is a reference for one or more other columns sensed.

19. The system of claim 18, wherein a single row of the capacitive sensor array is a reference for one or more other rows sensed.

* * * * *